United States Patent [19]

Hammer et al.

[11] Patent Number: 5,668,992
[45] Date of Patent: Sep. 16, 1997

[54] SELF-CONFIGURING COMPUTER SYSTEM

[75] Inventors: Jack L. Hammer, Lexington; Jeffrey V. Ford, Nicholasville, both of Ky.; L. Bowen Caldwell, Charlotte, N.C.

[73] Assignee: International Business Machines Corporation, Armonk, N.Y.

[21] Appl. No.: 284,014

[22] Filed: Aug. 1, 1994

[51] Int. Cl.$^6$ .................................................. G06F 9/44
[52] U.S. Cl. ............................................................ 395/651
[58] Field of Search .................................... 395/700, 650, 395/651, 652, 653, 712

[56] References Cited

U.S. PATENT DOCUMENTS

| | | | |
|---|---|---|---|
| 5,291,585 | 3/1994 | Sato et al. | 395/500 |
| 5,325,532 | 6/1994 | Crosswy et al. | 395/700 |
| 5,426,775 | 6/1995 | Boccon-Gibod | 395/575 |

FOREIGN PATENT DOCUMENTS 0592079   4/1994   European Pat. Off. ........ G06F 9/445

OTHER PUBLICATIONS

IBM Tech. Dislosure Bulletin, vol. 37, No. 2A, "Changing System Configurations for Shared Window Applications", Feb. 1994, p. 505.

*Primary Examiner*—Kevin A. Kriess
*Attorney, Agent, or Firm*—Bookstein & Kudirka, P.C.

[57] ABSTRACT

A self configuring computer system, which configures and loads appropriate software to support custom configurations without manual intervention by the user or the manufacturer, is disclosed. The invention includes an "interrogation" module, stored on a system disk and loaded when the computer is first activated, that scans the system for components requiring specific software to operate. The interrogation module obtains identification data from these components and, based thereon, enables a startup module to select the appropriate software from a series of disk-based files. The startup module also executes configuration software having a characteristic naming pattern when the system is first activated, performs various one-time setup or configuration operations on at least the main system disk to render it compatible with the operating system, and selects the proper version of the operating system for the purchased system.

31 Claims, 4 Drawing Sheets

SELF-CONFIGURING COMPUTER SYSTEM

BACKGROUND OF THE INVENTION

1. Field of the Invention

The present invention relates to mass-marketed computer systems, and in particular to a computer that configures system files upon startup to conform to custom sets of software and hardware features.

2. Description of the Related Art

Small desktop and laptop computer systems sold to consumers generally include basic system hardware (a central-processing unit, or CPU; a standard allocation of random-access memory, or RAM; a display monitor; a hard-disk drive and a floppy-disk drive) and software (usually an operating system that may include a graphical user interface). However, depending on the customer's preferences, manufacturers may expand this basic package into a customized, user-defined system that includes additional items of hardware and software. For example, the customer may request a printer, special sound and video boards and a CD-ROM drive to support multimedia applications, additional memory, a larger or additional disk drive, etc. By providing these items with the delivered system, the manufacturer spares the customer the need to purchase and install these items separately.

Unfortunately, the customer's convenience can prove the manufacturer's bane. Each additional item, even routine hardware such as a disk drive, ordinarily requires reconfiguration of the basic system software. Devices such as mouse-pointers and special video hardware can require installation of separate software modules. Indeed, even standard software may be provided in multiple versions having different levels of capability, only one of which is to be made available to the user. If the custom system is to be shipped in a ready-to-use form, these installations and reconfigurations must ordinarily take place at the factory, requiring power-up and manual operation of the system. This process is both time-consuming and labor-intensive.

Hardware manufacturers also frequently "bundle" software produced by third parties with their systems. Such software may be capable of functioning on a variety of hardware platforms, e.g., by featuring a series of on-board software "drivers" or other interfaces; it is up to the user or the hardware vendor to select and install the appropriate driver. Similarly, the hardware manufacturer may itself produce a generic software version that may be configured to operate on any of a number of machines it sells. Once again, if the customer is to receive a ready-to-use system, the generic software must be manually loaded and adapted to the purchased system.

SUMMARY OF THE INVENTION

Description of the Invention

Advantages of the Invention

In light of the foregoing, the present invention offers the advantage of relieving the manufacturer of a custom computer system from the need to manually configure the system prior to shipment.

Another advantage of the invention is to facilitate automatic system configuration based on the software and hardware provided with that system.

It is still another advantage of the invention to permit automatic accommodation of generic software to a particular hardware platform.

Yet another advantage of the invention is to facilitate immediate availability of a computer system to the customer upon initial power-up.

Other advantages of the invention will, in part, be obvious and will, in part, be described hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

BRIEF SUMMARY OF THE INVENTION

The invention accomplishes the foregoing by establishing a single "interrogation" module, stored on a system disk and loaded when the CPU is first activated, that scans the system for components requiring specific software to operate. The interrogation module obtains identification data from these components and, based thereon, selects the appropriate software from a series of disk-based files.

The selected software files are identified and appropriate "install" or equivalent commands added to the initialization file so that, each subsequent time the system is powered up, the designated software files are located in mass storage and transferred into system memory.

In a second aspect of the invention, the interrogation module scans the system for files labeled with a characteristic identification pattern and executes these when the CPU is first activated. This feature supports self-configuring software and also permits third-party manufacturers of system components to include their own initial-configuration software.

In a third aspect of the invention, the system performs various one-time setup or configuration operations on at least the main system disk to render it compatible with the operating system, and selects the proper version of the operating system for the purchased system.

BRIEF DESCRIPTION OF THE DRAWING

The foregoing discussion will be understood more readily from the following detailed description of the invention, when taken in conjunction with the accompanying drawings, in which.

DESCRIPTION OF THE PREFERRED EMBODIMENT(S)

Detailed Description of the Preferred Embodiments

Figure 1:
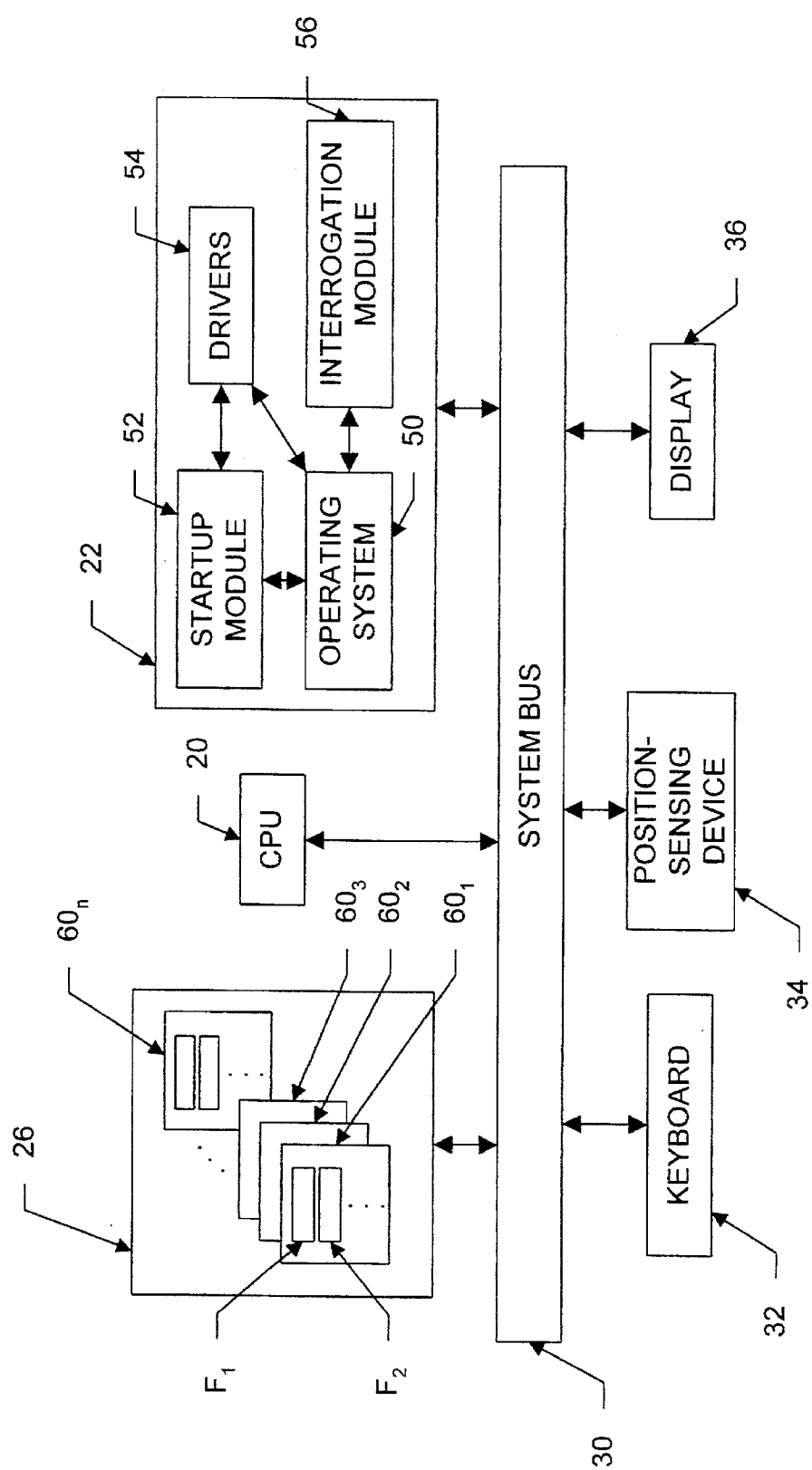
FIG. 1 is a block diagram of a computer system embodying the present invention.

Refer first to FIG. 1, which illustrates, in block-diagram form, a computer system or hardware platform incorporating the invention. The system includes a central-processing unit 20, which performs operations on and interacts with a main volatile system memory 22 and components thereof. The system further includes at least one mass storage device (most commonly a hard disk) 26, which contains permanent files of information. (Typically, a computer system is furnished with at least one floppy-disk drive in addition to a hard disk, the capacity of which is selected by the customer from a series of standard options; device 26 is intended to collectively denote all system disk drives.) All components of the system communicate over a system bus 30.

The system also features various peripherals that facilitate interaction with the user. These include a keyboard 32 and a position-sensing device (e.g., a mouse) 34. The output of either device can be used to designate information or select particular areas of a video or flat-panel display 36 corresponding to functions to be performed by the system. Other system components might include internal devices such as video cache memories, extended resident memory, sound boards, math coprocessors, and storage devices such as CD-ROM drives; and other peripherals such as modems and scanners. These internal and external devices are hereafter referred to generically as "accessories."

During system operation, main memory 22 contains an operating system 50, which is loaded from mass-storage device 26 (generally the hard disk) by a "bootstrap" program when the user turns on the computer. Operating system 50 directs the execution of low-level, basic system functions such as memory allocation, file management and operation of storage device 26. It also executes a system startup module 52 whose commands are stored in a special file (the CONFIG.SYS and AUTOEXEC.BAT files in DOS systems). The startup program "installs", or loads into system memory 22, a series of designated files necessary to operate or support the operation of various system components and accessories; such files are hereafter generically referred to as "drivers," and are indicated by reference numeral 54. For example, display 36 may represent an EGA, VGA or Super VGA video device, any of which requires a different display driver. As discussed below, when the system is first turned on, startup module 52 directs CPU 20 to load into system memory 22 an interrogation module 56, execution of which ensures that the proper drivers will be loaded during subsequent system power-ups.

In accordance with the invention, storage device 26 (preferably the hard disk) contains a series of file sets 601, 602, 603 ... 60n, each comprising a series of driver files F1, F2, etc. The file sets each correspond to system requirements that vary with characteristics of the system itself, and the constituent files furnish the full set of system variations. Thus, a file set may correspond to an accessory that can take multiple forms or versions, each requiring a different driver; or to system parameter files utilized by or integrated within operating system 50, and which vary from system to system; or to the basic startup module 52, which may vary with the system or its desired capabilities. The constituent files collectively provide all possible system or accessory options; for example, were the customer given the discretion to order an EGA, VGA or Super VGA display device, the file set 60 corresponding to display drivers would contain driver files F representing each of these display types.

Interrogation module 56 electronically identifies system parameters and the various accessories requiring drivers. It then designates the appropriate file (or files) F in each of the file sets 60 in a manner that ensures these will be loaded whenever the system is again started. The designation function is most straightforwardly accomplished by modifying startup module 52. For example, in a DOS environment, interrogation module 56 would designate the appropriate files in the CONFIG.SYS system file using the "install" instruction. Alternatively, if modification of startup module 52 is for some reason impractical, the selected files F can be renamed to conform to generic identifications in startup module 52. Actual interrogation is accomplished by utilizing operating system calls or direct access to examine the contents of ports, registers and chip settings; the details of such operations are specific to the particular accessories interrogated, are readily implemented by those skilled in the art.

Interrogation module 56 also examines system parameters, loading files F and/or modifying existing modules as appropriate. For example, if the customer's system includes a substantial amount of resident memory, it may be appropriate to load different versions of the startup module; and variations in the size and composition of storage device 26 can require changes to the operating system itself.

Finally, interrogation module 56 scans storage device 26 for files having a characteristic name or identification pattern; these represent non-standard initialization or setup files for software that interrogation module 56 has not been configured to install directly.

Figure 2A:
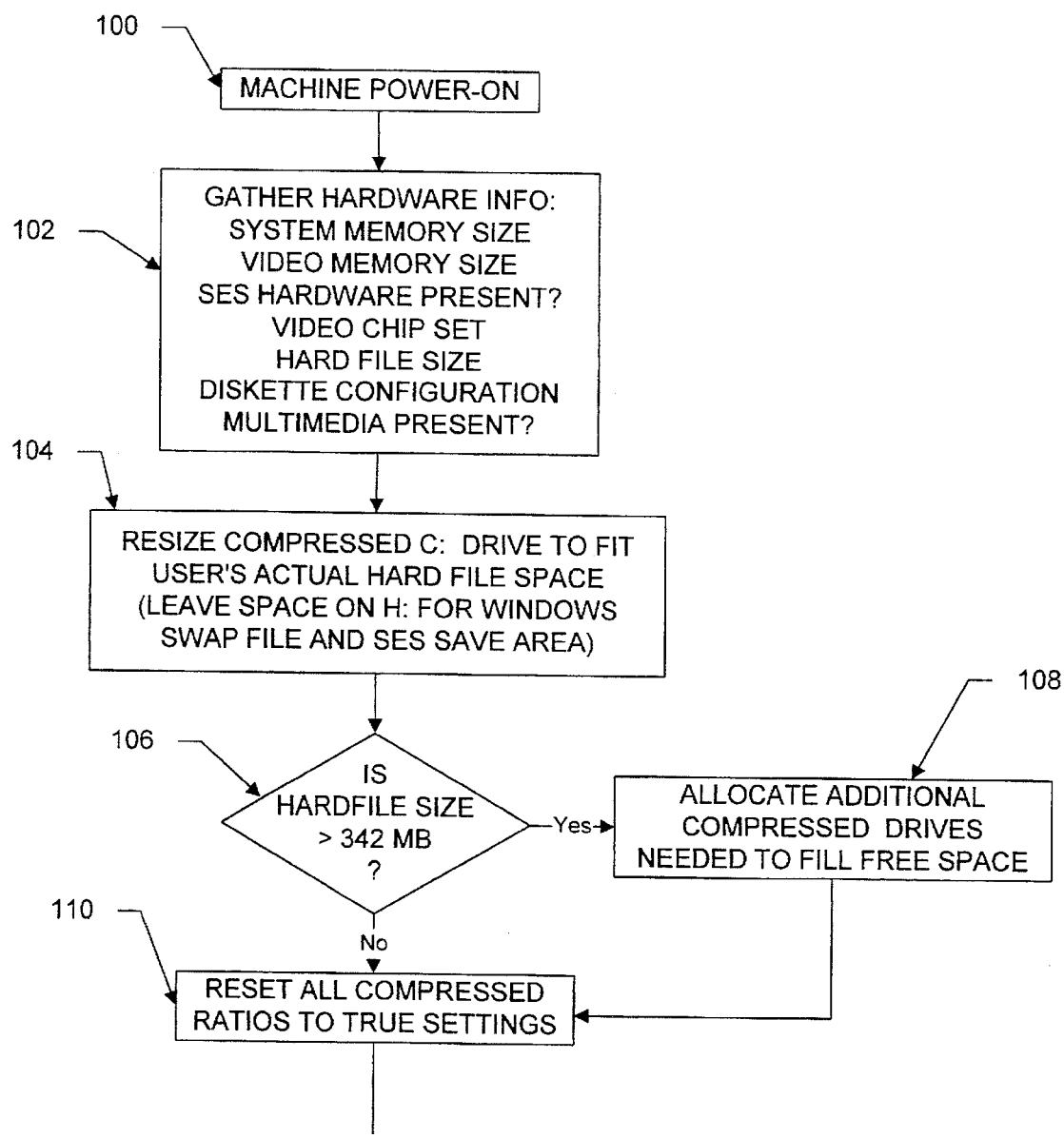
FIGS. 2A–2C collectively illustrate, in flow-chart form, operation of a representative embodiment of the invention.
Figure 2B:
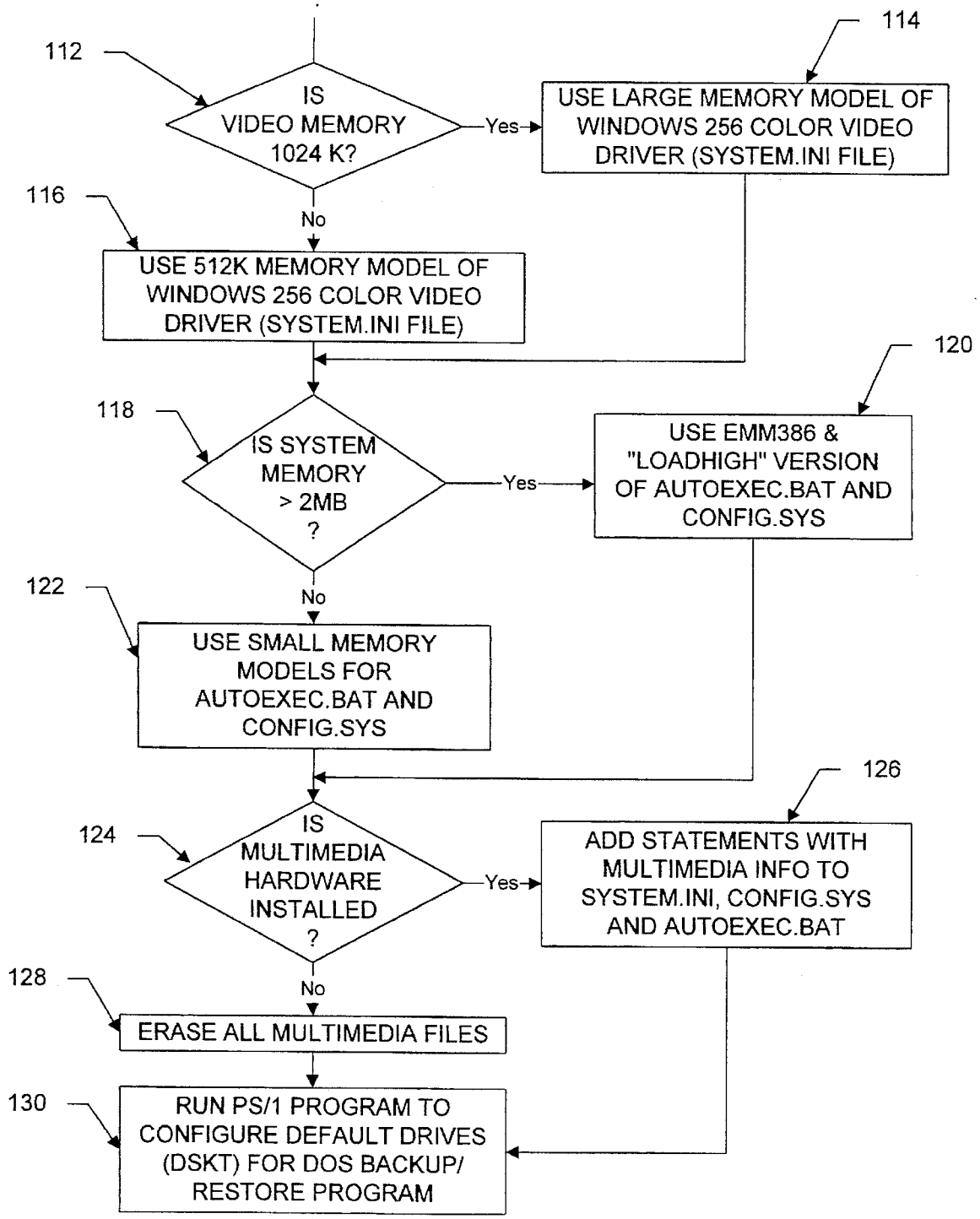
Figure 2C:
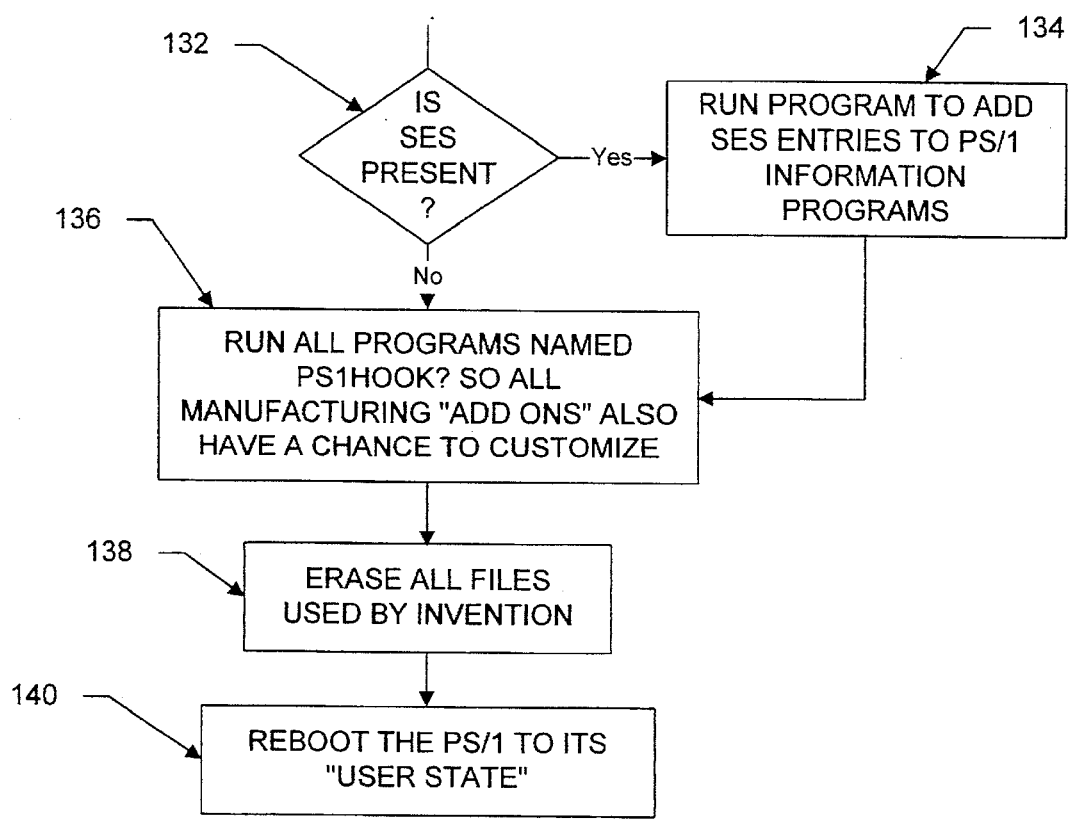

Refer now to FIGS. 2A–2C, which collectively depict the operation of a representative interrogation module in flowchart form. The depicted embodiment relates to the International Business Machines PS/1 computer system and its typical component variations. The process begins at block 100, when the system is first turned on, and thereafter passes to block 102. In this step, information regarding system characteristics is obtained. Specifically, the invention determines the size of system memory 22; the size of dedicated video memory; whether the "Smart Energy System"(SES) hardware and software components (which decrease the computer's energy consumption) are present; the type of video display; the size of the system hard disk; the type of floppy-disk drive(s) included with the system; and the presence or absence of multimedia hardware (in particular, a sound board and a CD-ROM drive).

The first action taken by the invention, indicated at block 104, is to reconfigure the hard (C:) drive to take advantage of disk compression by resizing the "logical" drive H:, which remains uncompressed; the H: drive contains a compressed volume file representing the C: drive as well as various system files that cannot be compressed. The effective size of the C: drive, expanded beyond its physical size by compression, depends on the size of the compressed volume file, which, of course, is ultimately limited by the physical size of the C: drive (and the need to reserve some uncompressed disk space). The invention therefore determines the physical size of the C: drive and, based thereon, sets the size of the compressed volume file.

However, if the physical size of the C: drive exceeds the size needed for the largest compressed volume file allowed, it becomes necessary to add more logical drives with associated compressed volume files. The invention makes this determination at step 106, creating the additional logical drives and compressed volume files at step 108. In particular, the largest compressed volume file allowed in connection with the PS/1 system is 512 megabytes (MB); disks larger than the standard 342 MB drive can accommodate more compressed volume file space, and so additional logical drives are created. If the physical size of the C: drive is less than 342 MB, no additional drives are created, as indicated at block 110.

Alternatively, the invention can be straightforwardly configured to allocate disk space by creating actual disk partitions, rather than resizing the existing drives and creating logical drives.

Depending on the size of the dedicated video memory, interrogated at step 102, the invention then determines, at step 112, whether to designate the large-memory (block 114) or 512 K-memory (block 116) video driver. Both of these driver files exist on the system hard disk, and the invention modifies the SYSTEM.INI file to designate the proper one. Similarly, depending on the size of system memory, the invention determines, at step 118, which of two possible versions of AUTOEXEC.BAT and CONFIG.SYS (blocks 120, 122) to utilize. The selected version is stored on the hard drive, and replaces the version present when the invention was first activated.

If multimedia hardware has been installed (block 124), the startup module, which includes the SYSTEM.INI, CONFIG.SYS and AUTOEXEC.BAT files, is appropriately modified at step 126; otherwise, all files relating to multimedia hardware are erase at step 128.

If SES is present (block 132), an installation program is run (block 134) to add the SES entries to informational system programs and the Windows Program Manager screen.

At step 136, the invention scans the hard disk for files having a characteristic naming pattern (specifically, those files having names beginning with the characters PS1HOOK), and executes these files.

Finally, its tasks accomplished, the invention removes itself from the system by deleting all interrogation module files (step 138), and reboots the system to run in accordance with the modifications it has introduced (step 140).

It will therefore be seen that the foregoing represents an efficient approach to system configuration that avoids the need for manufacturer or user involvement. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A self-configuring data processing system comprising a processor unit, at least one mass-storage disk and a video display, the system comprising:

a. a first set of discrete files electronically stored on a disk, each file containing processor instructions capable of directing the operation of an operating system on a different hardware platform;

b. a second set of discrete files electronically stored on a disk, each file containing processor instructions capable of directing the operation of a plurality of video displays;

c. a third set of discrete files electronically stored on a disk, each file containing processor instructions capable of directing the operation of a plurality of hardware accessories;

d. an interrogation module for interrogating the system to determine parameters associated with at least one disk, the video display and system accessories; and e. a startup module for permanently designating a subset of each of the first, second and third sets of discrete files for automatic selection each time the processor is actuated based on the interrogation, the startup module establishing the size of at least one disk based on the disk parameters determined by the interrogation module and creating at least one logical drive including uncompressed disk files and a compressed volume file to facilitate disk compression.

2. The system of claim 1 wherein the processor loads the permanently selected files into a volatile system memory each time the processor is actuated.

3. The system of claim 1 wherein the interrogation module is adapted for scanning at least one disk for files executable by the processing unit and having names conforming to a predetermined identification pattern.

4. The system of claim 1 wherein the file subsets are designated by identifying them to a startup file.

5. The system of claim 4 wherein the file subsets are designated in the CONFIG.SYS file using the INSTALL instruction.

6. The system of claim 1 wherein the file subsets are designated by renaming them to conform to generic identifications in a startup file.

7. The system of claim 1 wherein the interrogation module examines the contents of ports, registers and chip settings.

8. The system of claim 1 wherein the startup module erases undesignated files in at least one of the first, second and third sets of discrete files.

9. The system of claim 1 wherein the second set of discrete files contains multiple drivers, each designed to function with a different system memory size, for a display device.

10. The system of claim 1 wherein the startup module partitions at least one disk.

11. The system of claim 1 wherein the interrogation means determines whether the system includes multimedia hardware, and further wherein the startup module installs drivers to support multimedia hardware whose presence is determined by the interrogation means.

12. The system of claim 1 wherein the system further comprises an operating system and a volatile system memory, and the mass-storage disk contains executable instructions corresponding to the functions of the interrogation module and the startup module, the operating system being configured to load into volatile memory and facilitate the execution of the instructions upon system startup.

13. A self-configuring data processing system comprising:

a. a processor unit;

b. at least one mass-storage disk;

c. a video display;

d. a position-sensing device;

e. a keyboard;

f. a first set of discrete files electronically stored on a disk, each file containing processor instructions capable of directing the operation of an operating system on a different hardware platform;

g. a second set of discrete files electronically stored on a disk, each file containing processor instructions capable of directing the operation of a plurality of video displays;

h. a third set of discrete files electronically stored on a disk, each file containing processor instructions capable of directing the operation of a plurality of hardware accessories;

i. an operating system;

j. an interrogation module for interrogating, in cooperation with the operating system, the data-processing system to determine parameters associated with at least one disk, the video display and system accessories; and k. a startup module for permanently designating, in cooperation with the operating system, a subset of each of the first, second and third sets of discrete files for automatic selection each time the processor is actuated based on the interrogation, the startup module establishing the size of at least one disk based on the disk parameters determined by the interrogation module and creating at least one logical drive including uncompressed disk files and a compressed volume file to facilitate disk compression.

14. A self-configuring data processing system comprising a processor unit, at least one mass-storage disk and a video display, the system comprising:

a. a set of discrete files electronically stored on a disk;

b. an interrogation module for interrogating the system to determine parameters associated with at least one disk, the video display and system accessories; and c. a startup module for permanently designating subsets of the discrete files for automatic selection each time the processor is actuated based on the interrogation, the file subsets each containing processor instructions for operating one of the disk, the video display and the system accessories identified by the interrogation module, the file subsets being designated to a startup file and the startup module erasing undesignated files from the set of discrete files.

15. The system of claim 14 wherein the discrete files include a first set of files each containing processor instructions capable of directing the operation of an operating system on a different hardware platform; a second set of files each containing processor instructions capable of directing the operation of a plurality of video displays; and a third set of files each containing processor instructions capable of directing the operation of a plurality of hardware accessories.

16. The system of claim 14 wherein the processor loads the permanently selected files into a volatile system memory each time the processor is actuated.

17. The system of claim 14 wherein the interrogation module is adapted for scanning at least one disk for files executable by the processing unit and having names conforming to a predetermined identification pattern.

18. The system of claim 14 wherein the startup module establishes the size of at least one disk based on the disk parameters determined by the interrogation module.

19. The system of claim 18 wherein the startup module creates at least one logical drive including uncompressed disk files and a compressed volume file to facilitate disk compression.

20. A method of causing a dam processing system comprising a processor unit, at least one mass-storage disk and a video display to configure itself upon startup, the method comprising:

a. electronically storing sets of discrete files on a disk, a first set of files containing processor instructions capable of directing the operation of an operating system on a different hardware platform, a second set of files containing processor instructions capable of directing the operation of a plurality of video displays, and a third set of containing processor instructions capable of directing the operation of a plurality of hardware accessories;

b. interrogating the system to determine parameters associated with at least one disk, the video display and system accessories; and c. permanently designating subsets of the discrete files for automatic selection each time the processor is actuated based on the interrogation, the file subsets each containing processor instructions for one of the operating the disk, the video display and the system accessories identified by the interrogation module; and d. erasing undesignated files in at least one of the first, second and third sets of files.

21. The method of claim 20 wherein the designation step causes the processor to load the permanently selected files into a volatile system memory each time the processor is actuated.

22. The method of claim 20 wherein the interrogation step includes the substep of scanning at least one disk for files executable by the processing unit and having names conforming to a predetermined identification pattern.

23. The method of claim 20 wherein the file subsets are designated by identifying them to a startup file.

24. The method of claim 23 wherein the file subsets are designated in the CONFIG.SYS file using the INSTALL instruction.

25. The method of claim 20 wherein the file subsets are designated by renaming them to conform to generic identifications in a startup file.

26. The method of claim 20 wherein the interrogation step entails examining the contents of ports, registers and chip settings.

27. The method of claim 20 wherein the second set of files contains multiple drivers, each designed to function with a different system memory size, for a display device.

28. The method of claim 20 further comprising the step of establishing the size of at least one disk based on the disk parameters determined during the interrogation step.

29. The method of claim 28 further comprising the step of creating at least one logical drive including uncompressed disk files and a compressed volume file to facilitate disk compression.

30. The method of claim 20 further comprising the step of partitioning at least one disk.

31. The method of claim 20 wherein the interrogation step includes the substep of determining whether the system includes multimedia hardware, and further comprising the step of installing drivers to support multimedia hardware whose presence is determined during the interrogation step.

* * * * *